(12) United States Patent
Seki et al.

(10) Patent No.: US 11,560,692 B2
(45) Date of Patent: Jan. 24, 2023

(54) WORK MACHINE

(71) Applicant: Komatsu Ltd., Tokyo (JP)

(72) Inventors: Yohei Seki, Tokyo (JP); Masataka Ozaki, Tokyo (JP); Kota Imanishi, Tokyo (JP)

(73) Assignee: Komatsu Ltd., Tokyo (JP)

( * ) Notice: Subject to any disclaimer, the term of this patent is extended or adjusted under 35 U.S.C. 154(b) by 350 days.

(21) Appl. No.: 16/650,104

(22) PCT Filed: Jul. 20, 2018

(86) PCT No.: PCT/JP2018/027390
§ 371 (c)(1),
(2) Date: Mar. 24, 2020

(87) PCT Pub. No.: WO2019/150602
PCT Pub. Date: Aug. 8, 2019

(65) Prior Publication Data
US 2020/0224391 A1    Jul. 16, 2020

(30) Foreign Application Priority Data

Jan. 31, 2018   (JP) .............................. JP2018-015935

(51) Int. Cl.
*E02F 9/26* (2006.01)
*E02F 3/34* (2006.01)
(Continued)

(52) U.S. Cl.
CPC .................. *E02F 9/26* (2013.01); *E02F 3/34* (2013.01); *E02F 9/0841* (2013.01); *G01B 11/245* (2013.01)

(58) Field of Classification Search
None
See application file for complete search history.

(56) References Cited

U.S. PATENT DOCUMENTS

| 4,379,568 A | 4/1983 | Kerkman |
| 6,167,336 A | 12/2000 | Singh et al. |
(Continued)

FOREIGN PATENT DOCUMENTS

| CA | 2942270 A1 | 4/2017 |
| CN | 108693695 A | 10/2018 |
(Continued)

OTHER PUBLICATIONS

Extended European Search Report dated Apr. 13, 2021, issued in the corresponding European patent application No. 18904145.2.
(Continued)

*Primary Examiner* — Michael S Lowe
(74) *Attorney, Agent, or Firm* — Locke Lord LLP

(57) ABSTRACT

A work machine includes: a vehicle body front part to which a front wheel is attached; a vehicle body rear part which is coupled to the vehicle body front part through an articulated mechanism and to which a rear wheel is attached; a working equipment coupled to the vehicle body front part; a headlight supported by the vehicle body front part and arranged above the front wheel; and a three-dimensional measurement device arranged on an outer side of the headlight in a vehicle width direction that is in parallel with a rotation axis of the front wheel.

7 Claims, 8 Drawing Sheets

(51) Int. Cl.
*E02F 9/08* (2006.01)
*G01B 11/245* (2006.01)

(56) References Cited

U.S. PATENT DOCUMENTS

| | | | |
|---|---|---|---|
| 6,247,538 B1 | 6/2001 | Takeda et al. | |
| 9,832,386 B2* | 11/2017 | Hasejima | E02F 9/264 |
| 10,118,553 B2 | 11/2018 | Matsuo et al. | |
| 10,183,632 B2* | 1/2019 | Nakanishi | B60R 11/04 |
| 10,385,542 B2 | 8/2019 | Shike et al. | |
| 10,652,521 B2 | 5/2020 | Itoh et al. | |
| 10,984,258 B2 | 4/2021 | Yoshikawa et al. | |
| 2014/0088824 A1 | 3/2014 | Ishimoto | |
| 2015/0210213 A1 | 7/2015 | Mitsuta et al. | |
| 2016/0006947 A1 | 1/2016 | Kowatari et al. | |
| 2017/0028922 A1 | 2/2017 | Matsuo et al. | |
| 2017/0284066 A1 | 10/2017 | Imaizumi et al. | |
| 2019/0037205 A1 | 1/2019 | Itoh et al. | |
| 2020/0104604 A1 | 4/2020 | Yoshikawa et al. | |

FOREIGN PATENT DOCUMENTS

| | | |
|---|---|---|
| CN | 110949254 A | 4/2020 |
| JP | H02-49741 U | 4/1990 |
| JP | H02-060631 U | 5/1990 |
| JP | H02-60677 U | 5/1990 |
| JP | H10-088625 A | 4/1998 |
| JP | 2007-297873 A | 11/2007 |
| JP | 2008-008183 A | 1/2008 |
| JP | 6091977 B2 | 3/2017 |
| JP | 2017-071915 A | 4/2017 |
| JP | 2017-135495 A | 8/2017 |
| JP | 2017-158134 A | 9/2017 |
| JP | 6232494 B2 | 11/2017 |
| JP | 2018-013985 A | 1/2018 |
| WO | 2012/157379 A1 | 11/2012 |
| WO | 2014/123228 A1 | 8/2014 |
| WO | 2017/077723 A1 | 5/2017 |

OTHER PUBLICATIONS

International Search Report dated Aug. 21, 2018, issued for PCT/JP2018/027390.

* cited by examiner

WORK MACHINE

FIELD

The present invention relates to a work machine.

BACKGROUND

A work machine is used in a worksite. A wheel loader is known as one kind of a work machine. An example of an automatic wheel loader is disclosed in Patent Literature 1.

CITATION LIST

Patent Literature

Patent Literature 1: Japanese Laid-open Patent Publication No. 2007-297873

SUMMARY

Technical Problem

In a case where automation of work by a work machine is realized, a technology capable of measuring relative positions of a work machine and a work target excellently is demanded.

An aspect of the present invention is to provide a work machine that can excellently measure a relative position with respect to a work target.

Solution to Problem

According to an aspect of the present invention, a work machine comprises: a vehicle body front part to which a front wheel is attached; a vehicle body rear part which is coupled to the vehicle body front part through an articulated mechanism and to which a rear wheel is attached; a working equipment coupled to the vehicle body front part; a headlight supported by the vehicle body front part and arranged above the front wheel; and a three-dimensional measurement device arranged on an outer side of the headlight in a vehicle width direction that is in parallel with a rotation axis of the front wheel.

Advantageous Effects of Invention

According to an aspect of the present invention, a work machine that can excellently measure a relative position with respect to a work target is provided.

DESCRIPTION OF EMBODIMENTS

In the following, an embodiment according to the present invention will be described with reference to the drawings. However, the present invention is not limited to this. Components of the embodiment described in the following can be arbitrarily combined. Also, there is a case where a part of the components is not used.

[Wheel Loader]

Figure 1:
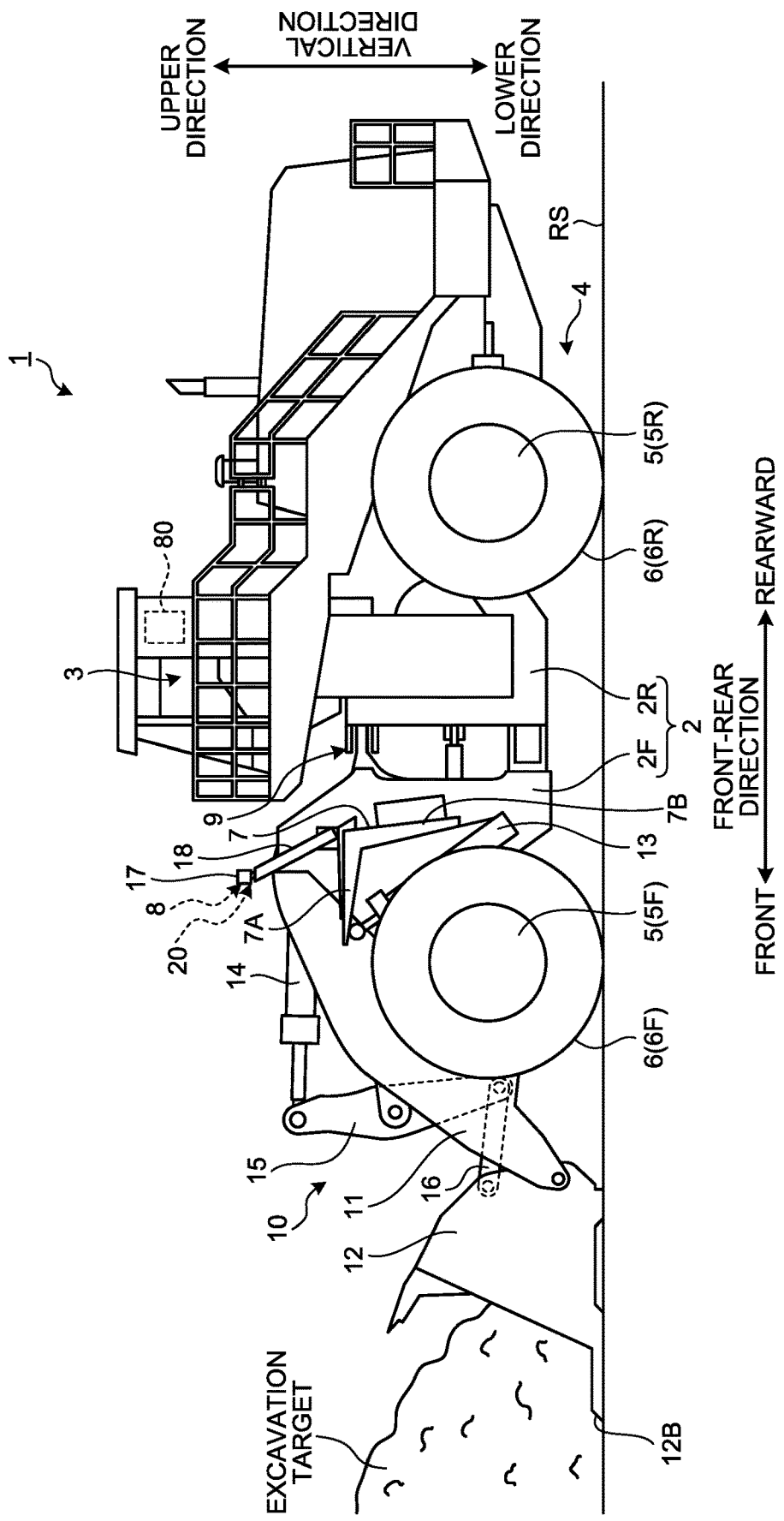
FIG. 1 is a side view illustrating a work machine according to the present embodiment.
Figure 2:
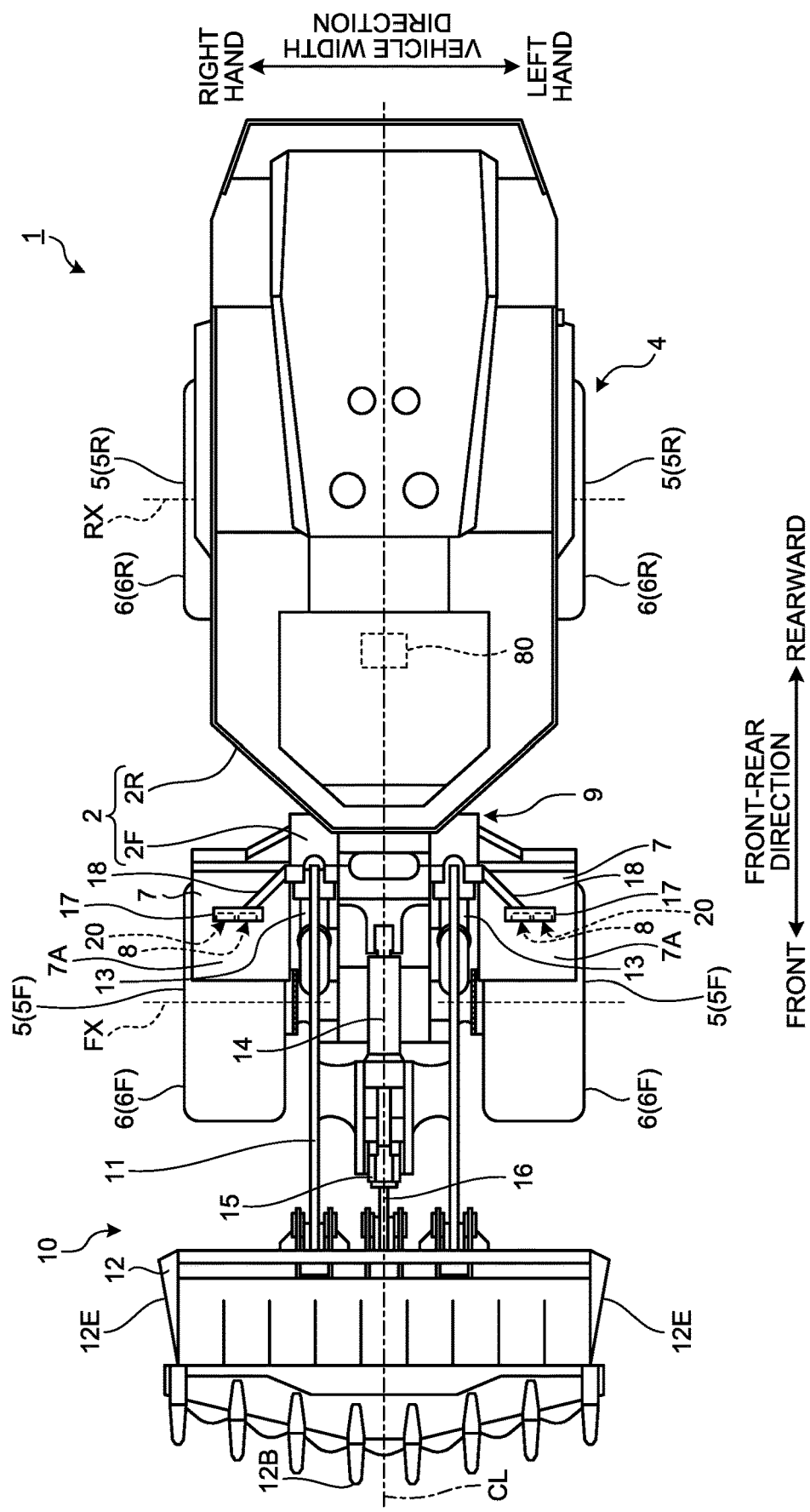
FIG. 2 is a top view illustrating the work machine according to the present embodiment.
Figure 3:
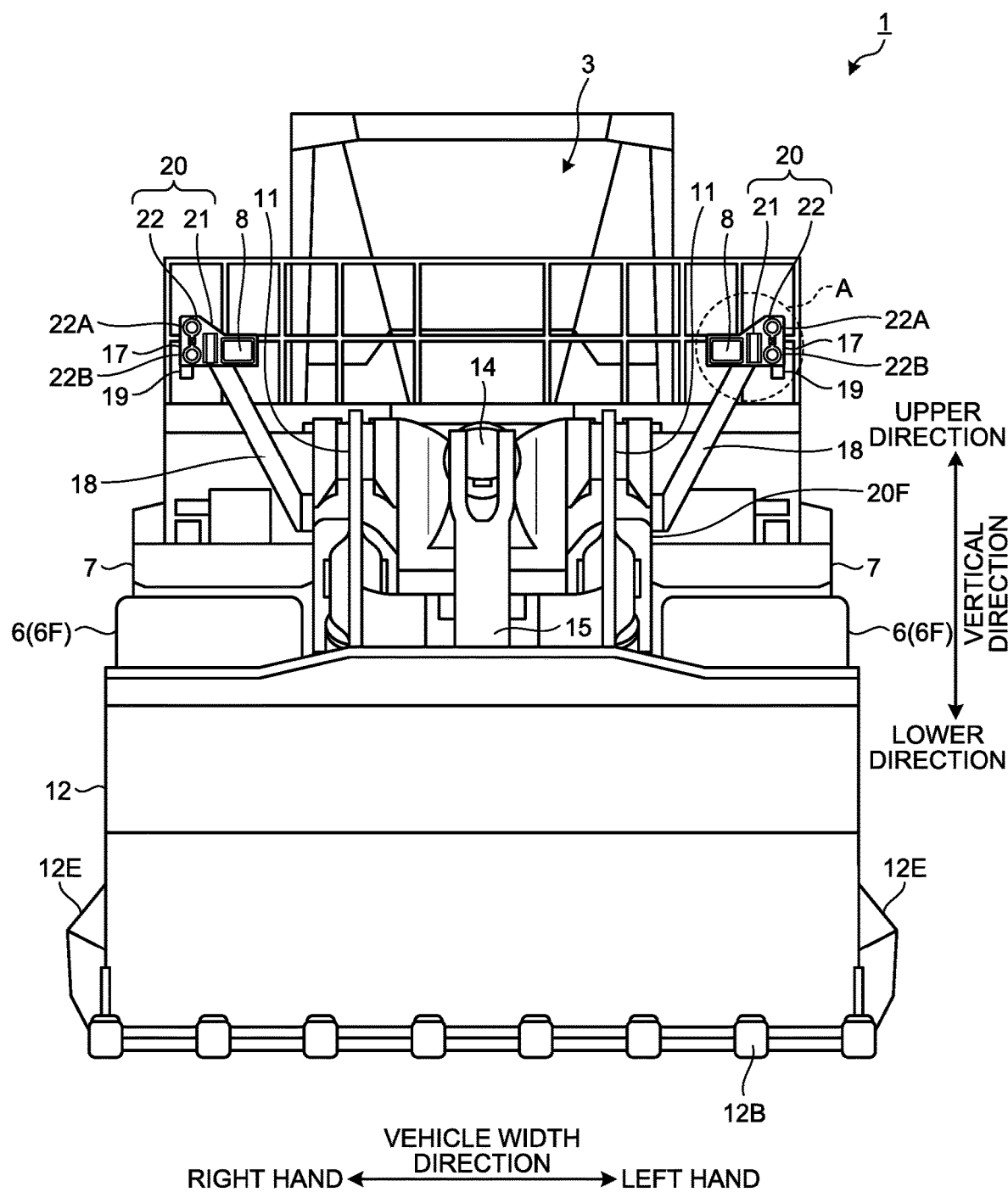
FIG. 3 is a front view illustrating the work machine according to the present embodiment.

FIG. 1 is a side view illustrating an example of a work machine 1 according to the present embodiment. FIG. 2 is a top view illustrating the example of the work machine 1 according to the present embodiment. FIG. 3 is a front view illustrating the example of the work machine 1 according to the present embodiment. The work machine 1 performs a predetermined operation at a worksite. In the present embodiment, it is assumed that the work machine 1 is a wheel loader 1 that is one kind of an articulated work machine. The wheel loader 1 performs an excavation operation to excavate an excavation target, and a loading/discharging operation to load or discharge, into a loading target or a discharge target, an excavated object excavated in the excavation operation. As the excavation target, at least one of natural ground, a rocky hill, and a wall is exemplified. The natural ground is a hill including earth and sand, and a rocky hill is a hill including rock or stone. As the loading target or discharge target, at least one of a transporter vehicle, a predetermined area of a worksite, a hopper, and a crusher is exemplified.

As illustrated in FIG. 1, FIG. 2, and FIG. 3, the wheel loader 1 includes a vehicle body 2, a cab 3 in which a driver seat is provided, a traveling device 4 that supports the vehicle body 2, a working equipment 10 supported by the vehicle body 2, a headlight 8 supported by the vehicle body 2, a three-dimensional measurement device 20 that measures a work target in front of the vehicle body 2, and a control device 80.

The vehicle body 2 includes a vehicle body front part 2F and a vehicle body rear part 2R. The vehicle body front part 2F and the vehicle body rear part 2R are connected in a bendable manner through an articulated mechanism 9.

The cab 3 is supported by the vehicle body 2. In the present embodiment, the traveling device 4 travels by operation by a driver. The working equipment 10 is controlled on the basis of a control signal output from the control device 80. A traveling operation device that operates the traveling device 4 is arranged in the cab 3. The driver activates the traveling device 4 by operating the traveling operation device. The traveling operation device includes an accelerator pedal, a brake pedal, a steering lever, and a forward/backward movement switching switch. A traveling speed of the wheel loader 1 is increased by operation on the accelerator pedal. The traveling speed of the wheel loader 1 is decreased or traveling of the wheel loader 1 is stopped by operation on the brake pedal. The wheel loader 1 swings by operation on the steering lever. By operation on the forward/backward movement switching switch, forward movement or backward movement of the wheel loader 1 is switched.

The traveling device 4 supports the vehicle body 2. The traveling device 4 has wheels 5. The wheels 5 are rotated by driving force generated by an engine 40 mounted in the vehicle body 2. Tires 6 are attached to the wheels 5. The wheels 5 include two front wheels 5F attached to the vehicle body front part 2F, and two rear wheels 5R attached to the vehicle body rear part 2R. The tires 6 include front tires 6F attached to the front wheels 5F, and rear tires 6R attached to the rear wheels 5R. The traveling device 4 can travel on the ground RS.

The front wheels 5F and the front tires 6F can rotate around a rotation axis FX. The rear wheels 5R and the rear tires 6R can rotate around a rotation axis RX.

In the following description, a direction in parallel with the rotation axis FX of the front wheels 5F will be arbitrarily referred to as a vehicle width direction, a direction orthogonal to contact surfaces of the front tires 6F which surfaces are in contact with the ground RS will be arbitrarily referred to as a vertical direction, and a direction orthogonal to both of the vehicle width direction and the vertical direction will be arbitrarily referred to as a front-rear direction. When the vehicle body 2 of the wheel loader 1 travels in a straight movement state, the rotation axis FX and the rotation axis RX are in parallel.

Also, in the following description, a position or a direction close to a center line CL of the vehicle body 2 in the vehicle width direction will be arbitrarily referred to as an inner side or an inner direction in the vehicle width direction, and a position or a direction far from the center line CL of the vehicle body 2 will be arbitrarily referred to as an outer side or an outer direction in the vehicle width direction. Also, in the vehicle width direction, one side of the center line CL of the vehicle body 2 will be arbitrarily referred to as a right side or a right hand, and an opposite side or an opposite direction of the right side or the right hand will be arbitrarily referred to as a left side or a left hand. Also, in the front-rear direction, a position or a direction close to the working equipment 10 with the driver seat in the cab 3 as a reference will be arbitrarily referred to as a front side or a front, and an opposite side or an opposite direction of the front side or the front will be referred to as a rear side or rearward. Also, in the vertical direction, a position or a direction close to the contact surfaces of the front tires 6F will be arbitrarily referred to as a lower side or a lower direction, and an opposite side or an opposite direction of the lower side or the lower direction will be arbitrarily referred to as an upper side or an upper direction.

The vehicle body front part 2F is arranged in front of the vehicle body rear part 2R. The front wheels 5F and the front tires 6F are arranged in front of the rear wheels 5R and the rear tires 6R. The front wheels 5F and the front tires 6F are respectively arranged on both sides in the vehicle width direction of the vehicle body 2. The rear wheels 5R and the rear tires 6R are respectively arranged on the both sides in the vehicle width direction of the vehicle body 2. The vehicle body front part 2F is bent to the right/left with respect to the vehicle body rear part 2R.

The wheel loader 1 includes a front fender 7 arranged in a part of a periphery of each of the front tires 6F. The front fender 7 includes a first member 7A arranged in an upper direction of a front tire 6F, and a second member 7B arranged in rearward of the front tire 6F. The front fender 7 is attached to each of a right part and a left part of the vehicle body front part 2F. The front fender 7 controls hitting by earth and sand, which is scattered from the ground RS in traveling of the wheel loader 1, on the vehicle body 2 and the cab 3.

The working equipment 10 is movably coupled to the vehicle body front part 2F. At least a part of the working equipment 10 is arranged in front of the front wheel 5F. The working equipment 10 includes a boom 11 movably coupled to the vehicle body front part 2F, a bucket 12 movably coupled to the boom 11, a bell crank 15, and a link 16.

The boom 11 is activated by power generated by a boom cylinder 13. The boom cylinder 13 is a hydraulic cylinder that generates power to operate the boom 11. One end part of the boom cylinder 13 is coupled to the vehicle body front part 2F. The other end part of the boom cylinder 13 is coupled to the boom 11. Two boom cylinders 13 are provided. One boom cylinder 13 is provided on a right hand of a center of the vehicle body front part 2F in the vehicle width direction. The other boom cylinder 13 is provided on a left hand of the center of the vehicle body front part 2F in the vehicle width direction. By extension/contraction of the boom cylinder 13, the boom 11 makes rising movement or lowering movement.

The rising movement of the boom 11 is movement in which a leading end part of the boom 11 rises in such a manner as to be separated from the ground RS. The lowering movement of the boom 11 is movement in which the leading end part of the boom 11 lowers in such a manner as to be closer to the ground RS. The boom 11 makes the rising movement and the lowering movement in a movable range of the boom 11. Movement above an upper end part of the movable range of the boom 11 is controlled in the boom 11 that makes the rising movement. Movement below a lower end part of the movable range of the boom 11 is controlled in the boom 11 that makes the lowering movement.

The bucket 12 is a working member having a leading end part 12B including a blade edge. The bucket 12 is arranged in front of the front wheel 5F. The bucket 12 is coupled to the leading end part of the boom 11. The bucket 12 is activated by power generated by a bucket cylinder 14. The bucket cylinder 14 is a hydraulic cylinder that generates power to move the bucket 12. A center part of the bell crank 15 is rotatably coupled to the boom 11. One end part of the bucket cylinder 14 is coupled to the vehicle body front part 2F. The other end part of the bucket cylinder 14 is coupled to one end part of the bell crank 15. The other end part of the bell crank 15 is coupled to the bucket 12 through the link 16. One bucket cylinder 14 is provided. The bucket cylinder 14 is provided in a center part in the vehicle width direction. By extension/contraction of the bucket cylinder 14, the bucket 12 makes dumping movement or tilt movement.

The dumping movement of the bucket 12 is movement in which the bucket 12 is rotated in such a manner that an opening part of the bucket 12 faces downward and the leading end part 12B of the bucket 12 becomes closer to the ground RS. The tilt movement of the bucket 12 is movement in which the bucket 12 is rotated in such a manner that the opening part of the bucket 12 faces upward and the leading end part 12B of the bucket 12 is separated from the ground RS. The bucket 12 makes the dumping movement and the tilt movement in a movable range of the bucket 12. Movement below a lower end part of the movable range of the bucket 12 is controlled in the bucket 12 that makes the dumping movement. Movement above an upper end part of the movable range of the bucket 12 is controlled in the bucket 12 that makes the tilt movement.

By the dumping movement of the bucket 12, an excavated object scooped up with the bucket 12 is discharged from the bucket 12. By the tilt movement of the bucket 12, the bucket 12 scoops up the excavated object.

As illustrated in FIG. 2 and FIG. 3, end parts 12E on both sides of the bucket 12 are arranged on an outer side of the tires 6 in the vehicle width direction. That is, a distance in the vehicle width direction between an end part 12E on a right side and an end part 12E on a left side of the bucket 12 is longer than a distance in the vehicle-width direction between an outer side surface of a right tire 6 and an outer side surface of a left tire 6.

The headlight 8 emits illumination light to the front and illuminates an illumination range in front of the vehicle body front part 2F. The headlight 8 is supported by the vehicle body front part 2F. The headlight 8 is arranged above a front wheel 5F, a front tire 6F, and a front fender 7. One headlight 8 is arranged on each side of the boom 11 in the vehicle width direction, that is, on each of the left hand and the right hand of the center line CL of the vehicle body 2.

[Three-Dimensional Measurement Device]

Figure 4:
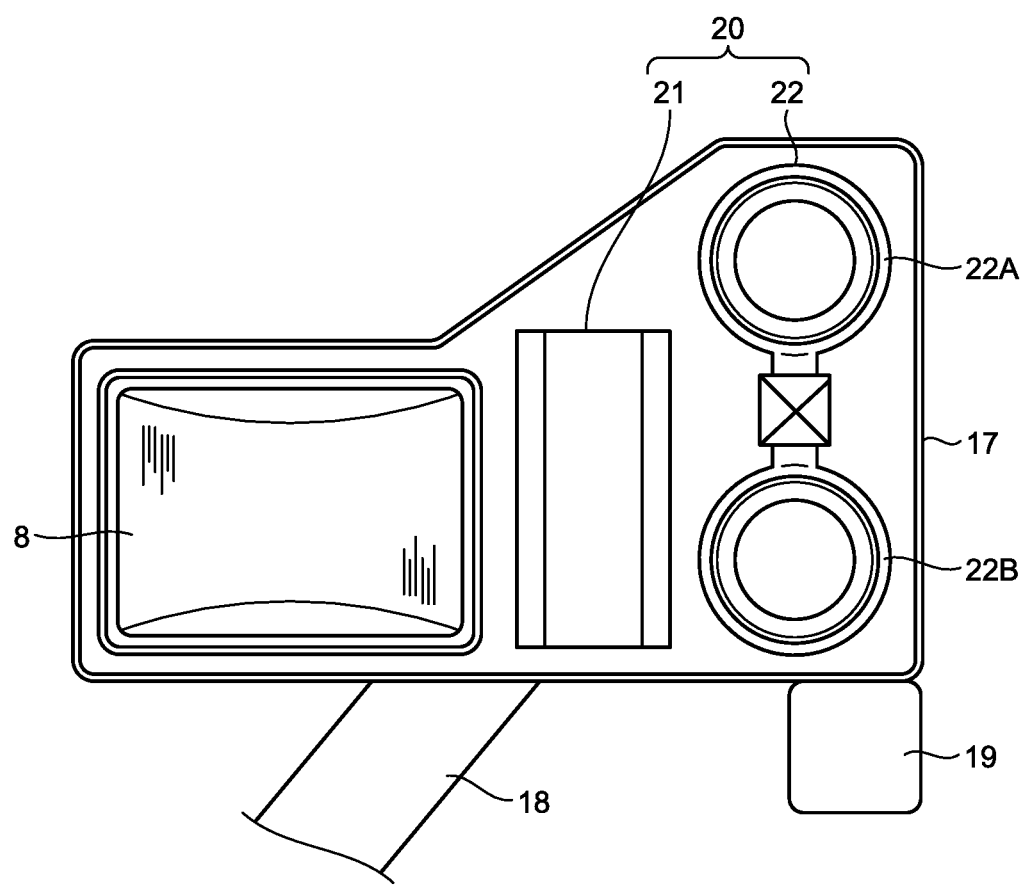
FIG. 4 is a view in which a part of the work machine according to the present embodiment is enlarged.

FIG. 4 is a view in which a part of the wheel loader 1 according to the present embodiment is enlarged, and which corresponds to a view in which an A-part in FIG. 3 is enlarged. As illustrated in FIG. 1, FIG. 2, FIG. 3, and FIG. 4, the wheel loader 1 includes a housing 17 that supports a headlight 8, and a supporting member 18 that supports the housing 17. The housing 17 is arranged in such a manner as to surround the headlight 8. The supporting member 18 is a rod-shaped member. A lower end part of the supporting member 18 is fixed to the vehicle body front part 2F. An upper end part of the supporting member 18 is fixed to the housing 17. The headlight 8 is supported by the vehicle body front part 2F through the housing 17 and the supporting member 18.

The headlight 8 is arranged in front of the articulated mechanism 9 in the front-rear direction. The headlight 8 is arranged below an upper end part of the cab 3 and is arranged above the front fender 7 in the vertical direction. In the present embodiment, the headlight 8 is arranged above an upper end part of the vehicle body front part 2F in the vertical direction.

The supporting member 18 is inclined upward to the front and the outer side in the vehicle width direction. The housing 17 and the headlight 8 supported by the supporting member 18 are arranged above a front wheel 5F, a front tire 6F, and a front fender 7.

The three-dimensional measurement device 20 measures a position or a shape of a work target in front of the vehicle body front part 2F. The work target includes one or both of an excavation target and a loading/discharge target. Also, a measurement controller 81 (described later) measures relative positions of the wheel loader 1 and the work target on the basis of measurement data by the three-dimensional measurement device 20.

The relative positions of the wheel loader 1 and the work target include a relative distance between an arbitrary point in the wheel loader 1 and an arbitrary point in the work target (absolute distance or distance related to one coordinate axis in predetermined coordinate system). Since the three-dimensional measurement device 20 measures a distance to each of a plurality of measurement points on a surface of the work target, the measurement controller 81 can measure a three-dimensional shape of the work target and a relative position with respect to the work target.

The three-dimensional measurement device 20 is arranged in a periphery of the headlight 8. For example, the periphery of the headlight 8 means a position in any of an upper direction, a side direction, and a lower direction in the vicinity of the headlight 8. The three-dimensional measurement device 20 is arranged on each of the left hand and the right hand of the center line CL of the vehicle body 2. In the present embodiment, the three-dimensional measurement device 20 is arranged on an outer side of the headlight 8 in the vehicle width direction. A three-dimensional measurement device 20 arranged on the left hand of the center line CL of the vehicle body 2 is arranged on a left hand of a headlight 8 arranged on the left hand of the center line CL of the vehicle body 2. A three-dimensional measurement device 20 arranged on the right hand of the center line CL of the vehicle body 2 is arranged on a right hand of a headlight 8 arranged on the right hand of the center line CL of the vehicle body 2. The three-dimensional measurement devices 20 are arranged in substantially the same positions as the headlights 8 in each of the vertical direction and the front-rear direction. That is, the three-dimensional measurement devices 20 are arranged in the vicinity of the headlights 8. In the present embodiment, each of the three-dimensional measurement devices 20 is supported by a housing 17.

Each of the three-dimensional measurement device 20 is installed in the vehicle body front part 2F through a different member. The three-dimensional measurement device 20 is arranged in front of the articulated mechanism 9 in the front-rear direction. Also, the three-dimensional measurement device 20 is arranged below the upper end part of the cab 3 and is arranged above the front fender 7 in the vertical direction. In the present embodiment, the three-dimensional measurement device 20 is arranged above the upper end part of the vehicle body front part 2F in the vertical direction. The three-dimensional measurement device 20 is arranged above a bucket upper end part in a state in which the bucket 12 is placed below such as a state in which a bottom surface of the bucket 12 is grounded. Also, in a state in which the bucket 12 is placed above such as a state in which the boom rises to the maximum height, the three-dimensional measurement device 20 is arranged below a bucket lower end part.

The three-dimensional measurement device 20 is arranged on each side of the boom 11 in the vehicle width direction. The three-dimensional measurement device 20 is arranged above a front wheel 5F, a front tire 6F, and a front fender 7.

The three-dimensional measurement device 20 is arranged on an inner side of an end part 12E of the bucket 12 in the vehicle width direction. That is, the three-dimensional measurement device 20 is arranged between the headlight 8 and the end part 12E of the bucket 12 in the vehicle width direction.

In the present embodiment, the three-dimensional measurement device 20 includes a laser radar 21 that is one kind of a laser measurement device, and a stereo camera 22 that is one kind of a photogrammetric device.

In the present embodiment, the laser radar 21 and the stereo camera 22 are arranged in the vehicle width direction. The stereo camera 22 is arranged on an outer side of the laser radar 21 in the vehicle width direction.

The laser radar 21 includes an irradiator that emits laser light to a work target, and a light receiver that receives at least a part of the laser light scattered on the work target. Reception light data acquired by the light receiver of the laser radar 21 is output to the measurement controller 81. The measurement controller 81 measures a three-dimensional shape of the work target and a relative position with respect to the work target on the basis of the reception light data by the light receiver of the laser radar 21.

The stereo camera 22 includes a first camera 22A and a second camera 22B. In the present embodiment, the first camera 22A and the second camera 22B are arranged in the vertical direction. Image data acquired by the first camera 22A and image data acquired by the second camera 22B are output to the measurement controller 81. The measurement controller 81 performs stereo processing on the basis of the image data acquired by the first camera 22A and the image data acquired by the second camera 22B, and measures a three-dimensional shape of the work target and a relative position with respect to the work target.

Note that a blinker lamp 19 is provided in a lower part of the housing 17.

[Control Device]

Figure 5:
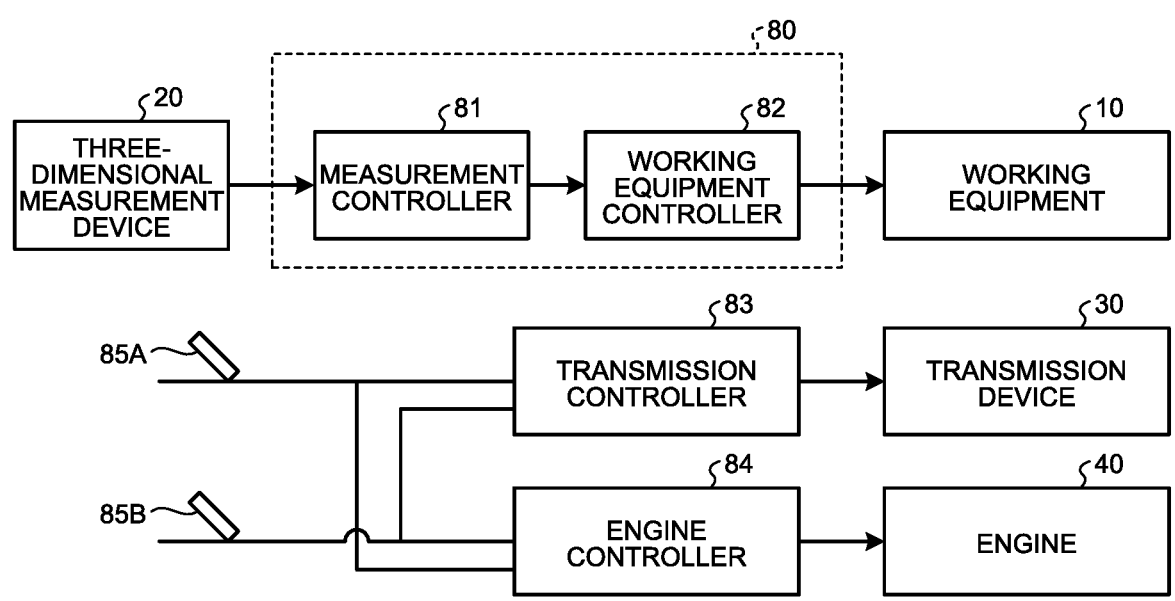
FIG. 5 is a block diagram illustrating the work machine according to the present embodiment.

FIG. 5 is a block diagram illustrating an example of the wheel loader 1 according to the present embodiment. The control device 80 includes a computer system. The control device 80 includes a measurement controller 81 and a working equipment controller 82. Each of the measurement controller 81, the working equipment controller 82, a transmission controller 83, and an engine controller 84 includes a processor such as a central processing unit (CPU), a main memory including a non-volatile memory such as a read only memory (ROM) and a volatile memory such as a random access memory (RAM), a storage, and an interface including an input/output circuit. A function of each controller is stored as a program in the storage. The processor reads a program from the storage, extracts the program into the main memory, and executes predetermined processing according to the program. Note that a program may be distributed to each controller through a network.

The measurement controller 81 is connected to three-dimensional measurement devices 20. The measurement controller 81 acquires measurement data from the three-dimensional measurement devices 20. The working equipment controller 82 outputs a control signal to control the working equipment 10. Also, the transmission controller 83 outputs a control signal to control a transmission device 83. The engine controller 84 outputs a control signal to control the engine 40. Also, the transmission controller 83 and the engine controller 84 are connected to each of an accelerator pedal 85A and a brake pedal 85B, and output control signals to control the transmission device 83 and the engine 40 on the basis of signals from the accelerator pedal 85A and the brake pedal 85B.

The three-dimensional measurement devices 20 are connected to the measurement controller 81. Measurement data by the three-dimensional measurement devices 20 is output to the measurement controller 81. The measurement controller 81 calculates relative positions of the wheel loader 1 and a work target on the basis of the measurement data by the three-dimensional measurement devices 20.

The working equipment controller 82 controls movement of the working equipment 10 on the basis of calculation data from the measurement controller 81. Controlling the movement of the working equipment 10 includes controlling movement of at least one of the boom cylinder 13 and the bucket cylinder 14. The wheel loader 1 includes a hydraulic pump, a boom control valve that controls a flow rate and a direction of a hydraulic oil supplied from the hydraulic pump to the boom cylinder 13, and a bucket control valve that controls a flow rate and a direction of a hydraulic oil supplied from the hydraulic pump to the bucket cylinder 14. By outputting a control signal to the boom control valve, the working equipment controller 82 can control a flow rate and a direction of the hydraulic oil supplied to the boom cylinder 13. Also, by outputting a control signal to the bucket control valve, the working equipment controller 82 can control a flow rate and a direction of the hydraulic oil supplied to the bucket cylinder 14.

[Movement]

Figure 6:
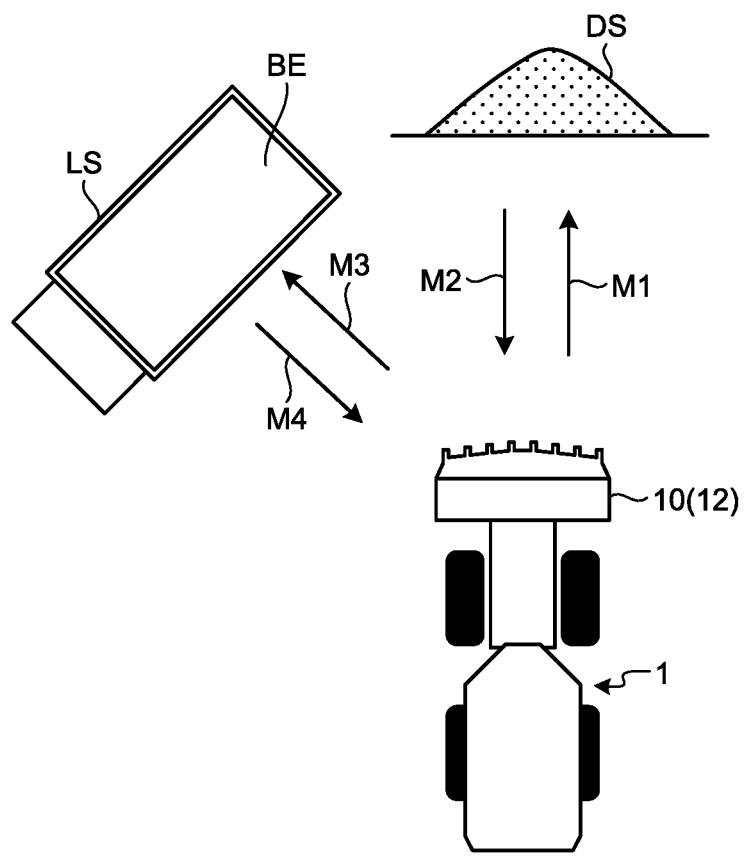
FIG. 6 is a schematic view illustrating movement of the work machine according to the present embodiment.

FIG. 6 is a schematic view illustrating movement of the wheel loader 1 according to the present embodiment. In the present embodiment, the wheel loader 1 performs an excavation operation to excavate an excavation target with the bucket 12, and a loading operation to load, into a loading target, an excavated object scooped up with the bucket 12 in the excavation operation. Natural ground DS is exemplified as the excavation target. As the loading target, a transporter vehicle LS such as a dump truck having a vessel BE (dump body) is exemplified.

A driver of the wheel loader 1 operates the traveling operation device, and makes the wheel loader 1 move forward and be closer to the natural ground DS as indicated by an arrow M1 in FIG. 6. The three-dimensional measurement device 20 mounted in the wheel loader 1 measures the natural ground DS. On the basis of calculation data by the measurement controller 81, the working equipment controller 82 controls the working equipment 10 in such a manner that the natural ground DS is excavated with the bucket 12. That is, the working equipment controller 82 controls the working equipment 10 in such a manner that the leading end part 12B of the bucket 12 touches the ground RS in a state in which the wheel loader 1 moves forward and becomes closer to the natural ground DS.

After the natural ground DS is excavated with the bucket 12 and an excavated object is scooped up with the bucket 12, the driver of the wheel loader 1 operates the traveling operation device, and makes the wheel loader 1 move backward and become separated from the natural ground DS as indicated by an arrow M2 in FIG. 6.

Next, the driver of the wheel loader 1 operates the traveling operation device, and makes the wheel loader 1 swing, move forward, and become closer to the transporter vehicle LS as indicated by an arrow M3 in FIG. 6. The three-dimensional measurement devices 20 mounted in the wheel loader 1 measure the transporter vehicle LS. On the basis of calculation data by the measurement controller 81, the working equipment controller 82 controls the working equipment 10 in such a manner that the excavated object held in the bucket 12 is loaded into the vessel BE of the transporter vehicle LS. That is, the working equipment controller 82 controls the working equipment 10 in such a manner that the boom 11 makes rising movement in a state in which the wheel loader 1 moves forward and becomes closer to the transporter vehicle LS. After the boom 11 makes the rising movement and the bucket 12 is arranged above the vessel BE, the working equipment controller 82 controls the working equipment 10 in such a manner that the bucket 12 makes tilt movement. With this arrangement, the excavated object is discharged from the bucket 12 and loaded into the vessel BE.

After the excavated object is discharged from the bucket 12 and is loaded into the vessel BE, the driver operates the traveling operation device, and makes the wheel loader 1 move backward, be separated from the transporter vehicle LS, and move forward again in a direction of the natural ground DS as indicated by an arrow M4 in FIG. 6.

The driver repeats the above-described movement until the vessel BE is filled with the excavated object.

In the present embodiment, the three-dimensional measurement device 20 is arranged on each side of the boom 11 in the vehicle width direction. Since the vehicle body front part 2F can face a work target before the vehicle body rear part 2R, the natural ground DS can be measured instantaneously by a three-dimensional measurement device 20 arranged on a right side of a center of the vehicle body front part 2F in the vehicle width direction in an example illustrated in FIG. 6. Also, the transporter vehicle LS is measured instantaneously by a three-dimensional measurement device 20 arranged on a left side of the center of the vehicle body front part 2F in the vehicle width direction.

Figure 7:
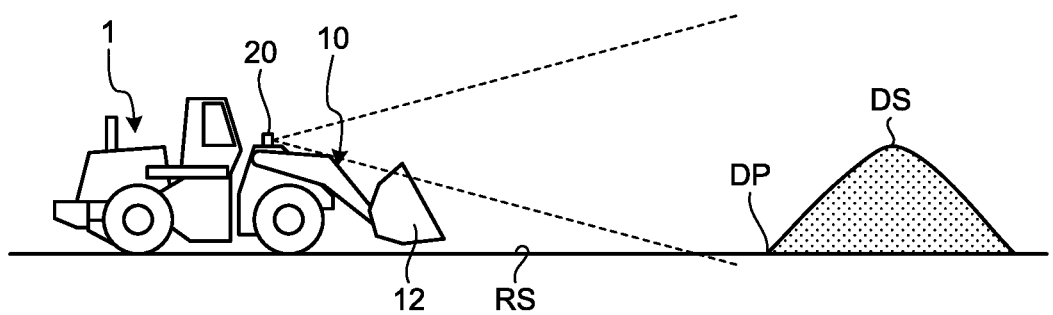
FIG. 7 is a schematic view illustrating an excavation operation by the work machine according to the present embodiment.

FIG. 7 is a schematic view illustrating the excavation operation by the wheel loader 1 according to the present embodiment. A driver of the wheel loader 1 operates the traveling operation device, and makes the wheel loader 1 move forward and be closer to the natural ground DS.

As illustrated in FIG. 7, the three-dimensional measurement devices 20 mounted in the wheel loader 1 measure a three-dimensional shape of the natural ground DS. On the basis of measurement data by the three-dimensional measurement devices 20, the measurement controller 81 specifies a position of a boundary DP between the ground RS and the natural ground DS and calculates a relative position with respect to the wheel loader 1. Thus, as illustrated in FIG. 7, the three-dimensional measurement devices 20 are preferably arranged above a bucket upper end part in a state in which the bucket 12 is placed below such as a state in which a bottom surface of the bucket 12 is grounded.

Figure 8:
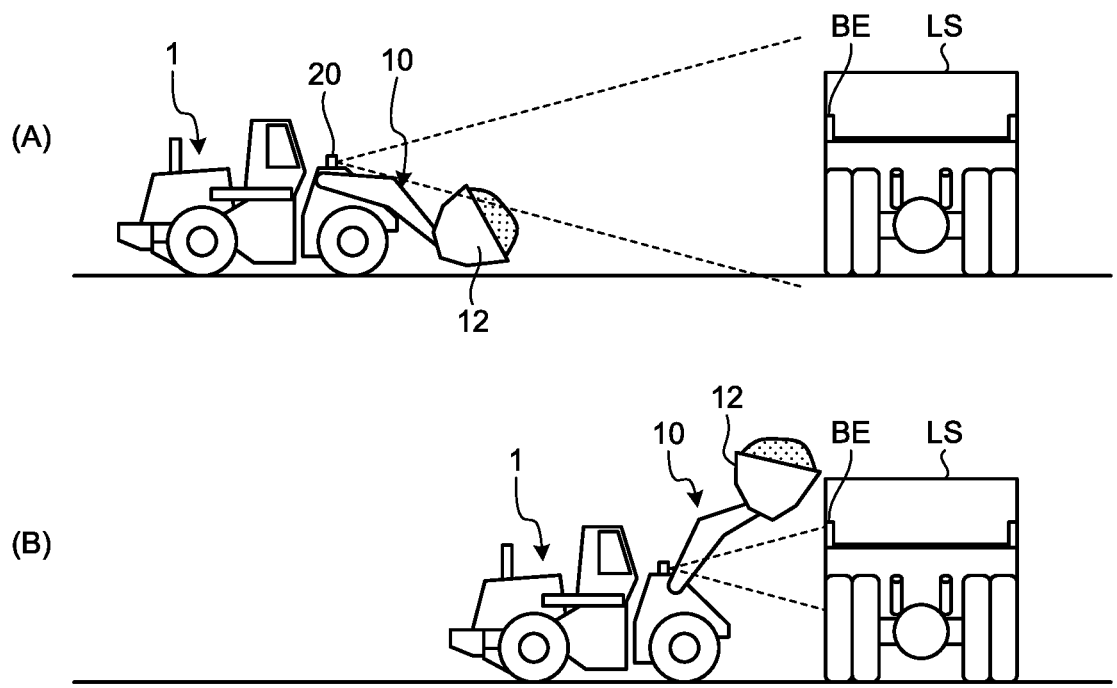
FIG. 8 is a schematic view illustrating a loading operation by the work machine according to the present embodiment.

FIG. 8 is a schematic view illustrating the loading operation by the wheel loader 1 according to the present embodiment. A driver of the wheel loader 1 operates the traveling operation device, and makes the wheel loader 1 move forward and be closer to the transporter vehicle LS. As illustrated in FIG. 8(A), the three-dimensional measurement devices 20 mounted in the wheel loader 1 measure a three-dimensional shape of the transporter vehicle LS. The measurement controller 81 calculates relative positions of the wheel loader 1 and the transporter vehicle LS on the basis of measurement data by the three-dimensional measurement devices 20.

As illustrated in FIG. 8(B), on the basis of the measurement data by the three-dimensional measurement devices 20, the measurement controller 81 makes, in a state in which the wheel loader 1 moves forward and becomes closer to the transporter vehicle LS, the boom 11 make rising movement while controlling an angle of the bucket 12 in such a manner that the bucket 12 is arranged above the upper end part of the vessel BE and an excavated object held in the bucket 12 is not scattered from the bucket 12. As illustrated in FIG. 8(B), in a state in which the bucket 12 is placed above such as a state in which the boom rises to the maximum height, the three-dimensional measurement devices 20 are preferably arranged below a bucket lower end part.

[Measurement Range]

Figure 9:
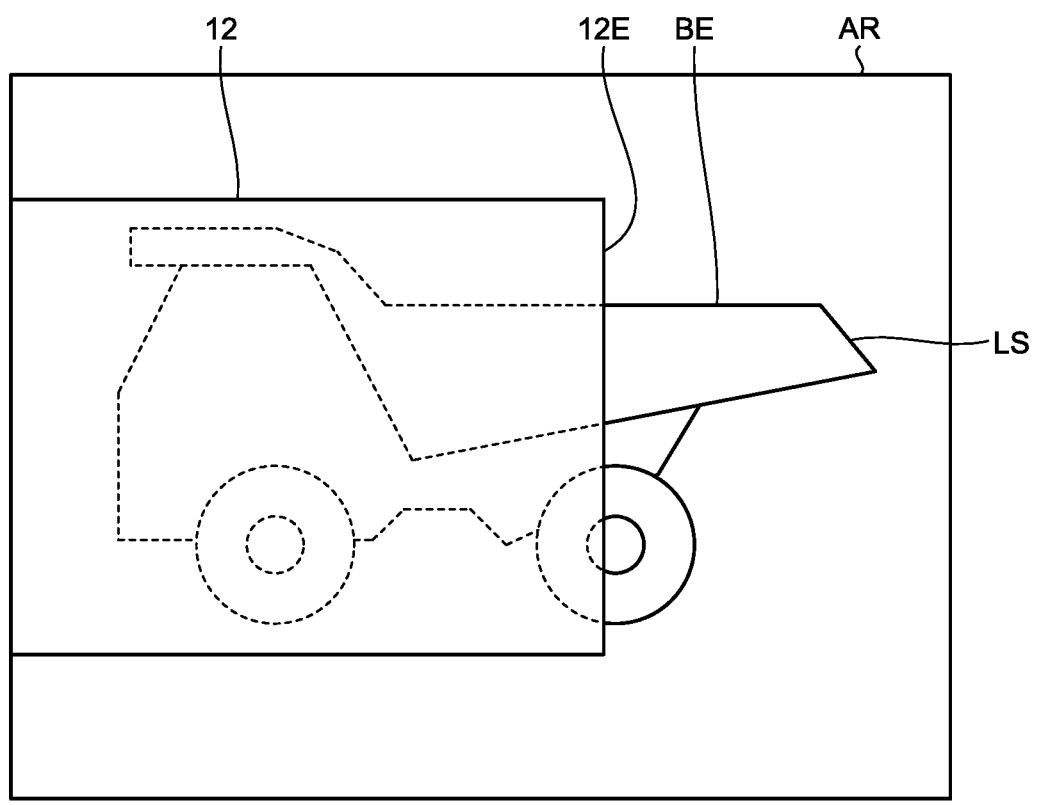
FIG. 9 is a schematic view illustrating a measurement range of a three-dimensional measurement device according to the present embodiment.

FIG. 9 is a schematic view illustrating a measurement range AR of each of the three-dimensional measurement devices 20 according to the present embodiment. The bucket 12 moves in the vertical direction. Thus, as illustrated in FIG. 9, there is a possibility that the bucket 12 enters a part of the measurement range AR of the three-dimensional measurement device 20. In the present embodiment, the measurement range AR of the three-dimensional measurement device 20 is prescribed to include a range on an outer side of an end part 12E of the bucket 12 in the vehicle width direction. Thus, even when the bucket 12 enters a part of the measurement range AR, the three-dimensional measurement device 20 can measure a work target in the range on the outer side of the end part 12E of the bucket 12.

[Stereo Camera]

As described above, in the present embodiment, the first camera 22A and the second camera 22B of the stereo camera 22 are arranged in the vertical direction. Since the first camera 22A and the second camera 22B are arranged in the vertical direction, the stereo camera 22 can accurately measure the vessel BE.

When the wheel loader 1 becomes closer to the transporter vehicle LS for the loading operation, an upper end part of the vessel BE photographed by the stereo camera 22 is substantially extended in the vehicle width direction (horizontal direction). Thus, when the first camera 22A and the second camera 22B are arranged in the vehicle width direction, there is a possibility that measurement accuracy of the upper end part of the vessel BE is deteriorated. Since the first camera 22A and the second camera 22B are arranged in the vertical direction, deterioration in measurement accuracy of the upper end part of the vessel BE is controlled.

The first camera 22A acquires first image data MA of a work target, and the second camera 22B acquires second image data MB of the work target. The measurement controller 81 performs image processing of the first image data MA and the second image data MB on the basis of a principle of triangulation and calculates a three-dimensional shape of the work target.

More specifically, the measurement controller 81 calculates a distance from the stereo camera 22 to a measurement point on the work target on the basis of a disparity indicating a distance between a projection point of a measurement point in the first image data MA and a projection point of a measurement point in the second image data MB.

In a case where a first camera MA and a second camera MB are arranged in the vehicle width direction, when image processing of the upper end part of the vessel BE is performed in a stereo system, many corresponding pixels PXb approximate to a focused pixel PXa exist in an epipolar line. As a result, a probability that a search becomes successful is deteriorated, and there is a possibility that measurement accuracy of the upper end part of the vessel BE is deteriorated.

In the present embodiment, the first camera MA and the second camera MB are arranged in the vertical direction orthogonal to an extension direction of the upper end part of the vessel BE. Thus, when image processing of the upper end part of the vessel BE is performed in the stereo system, the number of corresponding pixels PXb approximate to a focused pixel PXa in the epipolar line is small. Thus, a probability that a search becomes successful is increased, and deterioration in measurement accuracy of the upper end part of the vessel BE is controlled.

[Effect]

As described above, according to the present embodiment, each three-dimensional measurement device 20 is arranged on an outer side of a headlight 8 in a vehicle width direction. With this arrangement, the three-dimensional measurement device 20 can measure a work target that exists in a region on an outer side of an end part 12E of a bucket 12. Accordingly, the three-dimensional measurement device 20 can excellently measure a relative position with respect to the work target arranged on the outer side of the end part 12E of the bucket 12 in a measurement range AR.

Also, entrance of a working equipment 10 into the measurement range AR of the three-dimensional measurement device 20 is controlled. When a three-dimensional measurement device 20 is arranged in a center part in a vehicle width direction, a possibility that a working equipment 10 enters a measurement range AR of the three-dimensional measurement device 20 becomes high, and there is a possibility that a blind spot is generated in a work target. As a result, it becomes difficult for the three-dimensional measurement device 20 to measure the work target excellently. In the present embodiment, the three-dimensional measurement device 20 is arranged on the outer side of the headlight 8 in the vehicle width direction. Thus, entrance of the working equipment 10 into the measurement range AR of the three-dimensional measurement device 20 is controlled, and the three-dimensional measurement device 20 can excellently measure a relative position with respect to the work target arranged in the measurement range AR.

Also, since being arranged above a bucket upper end part in a state in which the bucket 12 is placed below such as a state in which a bottom surface of the bucket 12 is grounded, and being arranged below a lower end part of the bucket 12 in a state in which the bucket 12 is placed above such as a state in which a boom 11 rises to a maximum height, the three-dimensional measurement device 20 can securely measure a relative position with respect to the work target in any of situations of becoming closer to natural ground DS in a state in which the bucket 12 is placed below, and becoming closer to a transporter vehicle in a state in which the bucket 12 is placed above.

Also, the three-dimensional measurement device 20 is supported by a vehicle body front part 2F. With this arrangement, the three-dimensional measurement device 20 can measure a work target in front of the vehicle body front part 2F under the same condition in cases where an articulated mechanism 9 is bent and is not bent. Also, compared to a case where a three-dimensional measurement device 20 is installed in a vehicle body rear part 2R, it is possible to instantaneously measure a work target.

The three-dimensional measurement device 20 is supported by a housing 17 that supports the headlight 8. That is, the three-dimensional measurement device 20 is arranged in the vicinity of the headlight 8. The headlight 8 illuminates the measurement range AR of the three-dimensional measurement device 20. Thus, the three-dimensional measurement device 20 can excellently measure a work target illuminated by the headlight 8. Specifically, in a case where the three-dimensional measurement device 20 is a photogrammetric device such as a stereo camera 22, the photogrammetric device can excellently measure a work target when the work target is illuminated by illumination light.

The three-dimensional measurement device 20 is arranged on an inner side of an end part 12E of the bucket 12 in the vehicle width direction. With this arrangement, an increase in a vehicle width of the wheel loader 1 is controlled.

The measurement range AR of the three-dimensional measurement device 20 includes a range on the outer side of the end part 12E of the bucket 12 in the vehicle width direction. Accordingly, as illustrated in FIG. 9, even when the bucket 12 enters a part of the measurement range AR of the three-dimensional measurement device 20 due to a change in a posture of the working equipment 10, the three-dimensional measurement device 20 can measure the work target in the range on the outer side of the end part 12E of the bucket 12.

The three-dimensional measurement device 20 is arranged on each side of the boom 11 in the vehicle width direction. Also, since the vehicle body front part 2F can face a work target before the vehicle body rear part 2R, when the wheel loader 1 swings and becomes closer to each work target in a state in which a work target (excavation target and loading target) is arranged in each of right front and left front of the wheel loader 1, it is possible to instantaneously measure the work target by at least one of the three-dimensional measurement devices 20 respectively arranged on both sides of the boom 11 in the vehicle width direction,  as described with reference to FIG. 6. For example, when the wheel loader 1 moves forward and becomes closer to the natural ground DS while swinging clockwise, at least a three-dimensional measurement device 20 arranged on a right side of the boom 11 can measure the natural ground DS instantaneously. Also, when the wheel loader 1 moves forward and becomes closer to the transporter vehicle LS while swinging counterclockwise, at least a three-dimensional measurement device 20 arranged on a left side of the boom 11 can instantaneously measure the transporter vehicle LS.

Also, a first camera 22A and a second camera 22B of a stereo camera 22 are arranged in a vertical direction. With this arrangement, the stereo camera 22 can measure a vessel BE excellently.

Note that in the above-described embodiment, a three-dimensional measurement device 20 may be arranged in a periphery of a headlight 8. Also, a three-dimensional measurement device 20 may be supported by a member that is arranged highest on a vehicle width direction outer side among a plurality of members attached to a vehicle body front part 2F.

Note that in the above-described embodiment, it is assumed that both of the laser radar 21 and the stereo camera 22 are provided as the three-dimensional measurement device 20 in the wheel loader 1. One of the laser radar 21 and the stereo camera 22 may be provided in a wheel loader 1. Also, the three-dimensional measurement device 20 only needs to be able to measure a three-dimensional shape of a work target and a relative position with respect to the work target, and is not limited to the laser radar 21 and the stereo camera 22.

Note that in the above-described embodiment, it is assumed that a transmission controller 83 and an engine controller 83 are operated by a driver. However, a control signal may be generated on the basis of calculation data output from the measurement controller 81. Also, there may be no cab 3.

Also, both of movement of the traveling device 4 and movement of the working equipment 10 may be operated by the driver. Also, measurement data by the three-dimensional measurement device 20 and relative positions of the wheel loader 1 and the work target may be displayed on a display device arranged in a cab 3. The driver can recognize the measurement data by the three-dimensional measurement device 20 through the display device.

In the above-described embodiment, a position detection device such as a GPS sensor and a posture detection device such as an inertial measurement unit (IMU) may be provided in a wheel loader 1, and a position and a posture of the wheel loader 1 may be detected. A position of an excavation target in a site coordinate system may be detected on the basis of detection data by the position detection device and the posture detection device.

Note that in each of the above-described embodiments, a worksite where the wheel loader 1 performs an operation may be an excavation site in a mine, or may be a construction execution site or a construction site.

Note that the wheel loader 1 may be used in a snow removal operation, an operation in an agriculture and livestock industry, or an operation in a forest industry.

Note that in the above-described embodiment, the bucket 12 may have a plurality of blades or a straight blade edge.

Note that a working member coupled to a leading end part of a boom 11 does not need to be a bucket 12, and may be a snow plow or a snow bucket used in a snow removal operation, may be a bale grab or fork used in an operation in an agriculture and livestock industry, or may be a fork or a bucket used in an operation in a forest industry.

REFERENCE SIGNS LIST

1 WHEEL LOADER (WORK MACHINE)
2 VEHICLE BODY
2F VEHICLE BODY FRONT PART
2R VEHICLE BODY REAR PART
3 CAB
4 TRAVELING DEVICE
5 WHEEL
5F FRONT WHEEL
5R REAR WHEEL
6 TIRE
6F FRONT TIRE
6R REAR TIRE
7 FRONT FENDER
7A FIRST MEMBER
7B SECOND MEMBER
8 HEADLIGHT
9 ARTICULATED MECHANISM
10 WORKING EQUIPMENT
11 BOOM
12 BUCKET
12B LEADING END PART
12E END PART
13 BOOM CYLINDER
14 BUCKET CYLINDER
15 BELL CRANK
16 LINK
17 HOUSING
18 SUPPORTING MEMBER
19 BLINKER LAMP
20 THREE-DIMENSIONAL MEASUREMENT DEVICE
21 LASER RADAR
22 STEREO CAMERA
22A FIRST CAMERA
22B SECOND CAMERA
30 TRANSMISSION DEVICE
40 ENGINE
80 CONTROL DEVICE
81 MEASUREMENT CONTROLLER
82 WORKING EQUIPMENT CONTROLLER
83 TRANSMISSION CONTROLLER
84 ENGINE CONTROLLER
85A ACCELERATOR PEDAL
85B BRAKE PEDAL
AR MEASUREMENT RANGE
BE VESSEL (DUMP BODY)
DS NATURAL GROUND (EXCAVATION TARGET)
FX ROTATION AXIS
MA FIRST IMAGE DATA
MB SECOND IMAGE DATA
LS TRANSPORTER VEHICLE (LOADING TARGET)
RX ROTATION AXIS
RS GROUND

The invention claimed is:
1. A work machine comprising:
a vehicle body front part to which a front wheel is attached;
a vehicle body rear part which is coupled to the vehicle body front part through an articulated mechanism and to which a rear wheel is attached;
a working equipment coupled to the vehicle body front part;
a housing, supported by a supporting member which is fixed to the vehicle body front part, the housing arranged to surround and to support the following:
a headlight arranged above the front wheel; and
a three-dimensional measurement device arranged on an outer side of the headlight in a vehicle width direction that is in parallel with a rotation axis of the front wheel.
2. The work machine according to claim 1,
wherein the working equipment includes a boom coupled to the vehicle body front part, and a bucket coupled to the boom, and
the three-dimensional measurement device is arranged on an inner side of an end part of the bucket in the vehicle width direction.
3. The work machine according to claim 2,
wherein a measurement range of the three-dimensional measurement device includes a range on an outer side of the end part of the bucket in the vehicle width direction.
4. The work machine according to claim 1,
wherein the three-dimensional measurement device is arranged on each of a right hand and a left hand in the vehicle width direction.
5. The work machine according to claim 1,
wherein the three-dimensional measurement device is a stereo camera including a first camera and a second camera, and
the first camera and the second camera are arranged in a vertical direction.
6. The work machine according to claim 1,
wherein the working equipment includes a boom coupled to the vehicle body front part, and a bucket coupled to the boom, and
the three-dimensional measurement device is arranged above an upper end part of the bucket in a state in which the bucket is placed below the housing, and is arranged below a lower end part of the bucket in a state in which the bucket is placed above the housing.
7. A work machine comprising:
a vehicle body front part to which a front wheel is attached;
a vehicle body rear part which is coupled to the vehicle body front part through an articulated mechanism and to which a rear wheel is attached;
a boom coupled to the vehicle body front part;
a bucket coupled to the boom; and
a housing, supported by a supporting member which is fixed to the vehicle body front part, the housing arranged to surround and to support the following:
a headlight arranged above the front wheel; and
a three-dimensional measurement device that is arranged above an upper end part of the bucket in a state in which the bucket is placed below the housing, and is arranged below a lower end part of the bucket in a state in which the bucket is placed above the housing.

* * * * *